(12) United States Patent
Bellew

(10) Patent No.: US 6,988,094 B2
(45) Date of Patent: Jan. 17, 2006

(54) MULTI-PART LOOKED-UP TABLE FIELD AND ITS USE TO IN DATA PROCESSING OPERATIONS INVOLVING MULTIPLE TABLES OF A RELATIONAL DATABASE

(75) Inventor: Matthew A. Bellew, Seattle, WA (US)

(73) Assignee: BEA Systems, Inc., San Jose, CA (US)

(*) Notice: Subject to any disclaimer, the term of this patent is extended or adjusted under 35 U.S.C. 154(b) by 510 days.

(21) Appl. No.: 10/038,412

(22) Filed: Oct. 25, 2001

(65) Prior Publication Data
US 2004/0010507 A1    Jan. 15, 2004

(51) Int. Cl.
G06F 17/30    (2006.01)
G06F 7/00    (2006.01)
G06F 17/00    (2006.01)

(52) U.S. Cl. .......................... 707/2; 707/102
(58) Field of Classification Search ................ 707/102, 707/2
See application file for complete search history.

(56) References Cited

U.S. PATENT DOCUMENTS

| | | | |
|---|---|---|---|
| 5,291,583 A | * | 3/1994 | Bapat ........................ 717/137 |
| 5,412,804 A | | 5/1995 | Krishna |
| 5,548,755 A | * | 8/1996 | Leung et al. .................. 707/2 |
| 5,619,688 A | * | 4/1997 | Bosworth et al. .............. 707/4 |
| 5,832,477 A | | 11/1998 | Bhargava et al. |
| 6,088,691 A | | 7/2000 | Bhargava et al. |
| 2002/0013779 A1 | * | 1/2002 | Sridhar .......................... 707/4 |

\* cited by examiner

Primary Examiner—Hosain Alam
Assistant Examiner—Cheryl Fernandes
(74) Attorney, Agent, or Firm—Schwabe, Williamson & Wyatt, P.C.

(57) ABSTRACT

In accordance with a first aspect, a software component is equipped to identify looked-up table fields in a data processing statement, and automatically includes with a SQL statement one or more appropriate JOIN clauses joining one or more target tables from which the table fields are to be looked up with a basis table. In one embodiment, the looked-up table fields are expressed in a multi-part form. In accordance with a second aspect, a software component is equipped to automatically expand table fields available for inclusion in a data processing operation to include table fields of a target table of a look-up table field, in response to the selection of the look-up table field. In one embodiment, the second aspect is practiced in conjunction with the automatic inclusion of appropriate JOIN clauses to a SQL statement of the first aspect.

16 Claims, 6 Drawing Sheets

MULTI-PART LOOKED-UP TABLE FIELD AND ITS USE TO IN DATA PROCESSING OPERATIONS INVOLVING MULTIPLE TABLES OF A RELATIONAL DATABASE

BACKGROUND OF THE INVENTION

1. Field of the Invention

The present invention relates to the field of data processing. More specifically, the present invention relates to data processing techniques associated with data processing operations involving multiple tables of a relational database.

2. Background Information

In the course of the last two to three decades, relational database has arguably become the most widely used database model in database management. Along with the growing popularity of relational databases, the Structured Query Language (SQL) has become an indispensable tool for accessing data stored in tables of relational databases.

However, as those skilled in the art would appreciate, virtually all data accesses of any meaningful application would require access and processing of data resided in multiple tables. Such accesses and processing require the employment of the JOIN clause in a SQL statement (such as a SELECT, an INSERT, an UPDATE and a DELETE statement), joining tables of interest together. Experience has shown that except for professional programmers experienced with SQL, few users fully understand or are totally comfortable with joining tables. Unfortunately, the number of users having a need to access and process data dispersed in multiple tables in an unplanned manner far out number those who are skilled to comfortably do so.

Recently, advances in integrated circuit, microprocessor, networking and communication technologies, have resulted in the popularization of the World Wide Web (WWW) and Web based applications, making available even a greater reservoir of data for access. In turn, the knowledge or skill gap problem discussed earlier is further magnified.

Accordingly, an improved approach to accessing and processing data dispersed in multiple tables of relational databases, requiring lower data processing skill, is desired.

SUMMARY OF THE INVENTION

In accordance with a first aspect, a software component is equipped to identify looked-up table fields in a data processing statement, and automatically includes with a SQL statement one or more appropriate JOIN clauses joining one or more target tables from which the table fields are to be looked up with a basis table. The SQL statement may e.g. be an INSERT, a SELECT, an UPDATE and a DELETE statement.

In one embodiment, the looked-up table fields are expressed in a multi-part form comprising a first part corresponding to a look-up table field, and a second part corresponding to a looked-up table field, concatenated to the first part using a predetermined special character.

In accordance with a second aspect, a software component is equipped to automatically expand table fields available for inclusion in a data processing operation to include table fields of a target table of a look-up table field, in response to the selection of the look-up table field.

In one embodiment, the second aspect is practiced in conjunction with the automatic inclusion of appropriate JOIN clauses to a SQL statement of the first aspect.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a multi-part format for specifying a looked-up table field, and software components equipped with logic in support of the looked-up table field, making it easier for a less skillful user to access and process, or generate applications to access and process data dispersed in multiple tables of a relational database.

For ease of understanding, the present invention will be primarily described in the context of an application generator, referencing the SQL SELECT statement. However, the present invention is not so limited, and may be practiced with a number of other SQL statements, such as the INSERT, UPDATE or DELETE statement, and in a variety of other contexts, e.g. a database query facility. Further, in the description to follow, various aspects of the present invention will be described, specific numbers, materials and configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device, using terms such as statements, tables, fields, determining, identifying, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and/or optical components of the processor based device. Moreover, the term processor includes microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
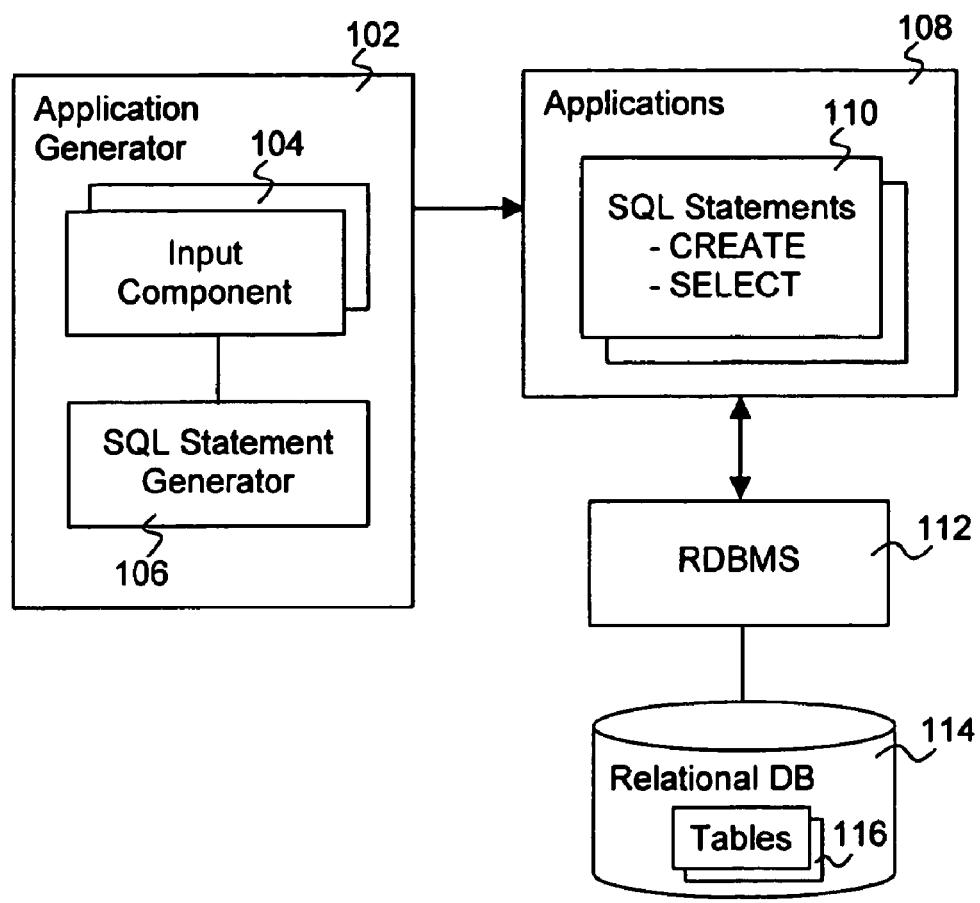
FIG. 1 illustrates an overview of the present invention on the context of an application generator, in accordance with one embodiment.

Referring now to FIG. 1, wherein a block diagram illustrating an overview of the present invention in the context of an application generator incorporated with the teachings of the present invention, in accordance with one embodiment, is shown. As illustrated, application generator 102 includes in particular input component 104 associated with a data processing operation, and SQL statement generator 106. In accordance with inputs received from an application developer user, application generator 102 generates applications 108. Included among applications 108 are SQL statements 110. SQL statements 110 include CREATE statements for use by applications 108 to create various tables 116 having a plurality of table fields (or simply fields) to store data, inside relational database 114, through relational database management system 112. SQL statements 110 also include SELECT statements for use by applications 108 to access created tables 116 for the stored data of the various fields (through relational database management system 112). As needed, SQL statements 110 may also include INSERT, UPDATE, DELETE and other statements.

As will be described in more details below, in accordance with a first aspect of the present invention, SQL statement generator 106 is advantageously equipped to support looked-up table fields, expressed in the multi-part form of the present invention. The support includes in particular the automatic generation of the appropriate JOIN clauses joining target tables (from which fields are to be looked up) to the basis table (comprising at least one of the look-up fields and typically, though not necessarily, other selected fields).

As will be also described in more details below, in accordance with a second aspect of the present invention, input component 104 of the data processing operation is advantageously equipped to present fields of a table for selection by an application developer user for inclusion in the data processing operation. Further, input component 104 is advantageously equipped to expand the list of fields available for selection to include fields of a target table, if a selected field has been previously defined to be a look-up field with the aforementioned target table.

Data processing operation may be any data processing operation known in art. An example of a data processing operation is report generation. Another example of a data processing operation is execution of a series of processing operations in the form of a script file. Accordingly, input component 104, may be a component of a report generator, a component of a script editor, or other software components of the like.

Further, in one embodiment, the second aspect is practiced in conjunction with the earlier described first aspect. That is, upon assistance of an application developer user in selecting the fields, including looked-up fields, for use in a data processing operation, SQL statements, such as SELECT, INSERT, UPDATE and DELETE statements, with appropriate JOIN clauses are generated.

Accordingly, the SQL knowledge required of an application developer user of application generator 102, in particular, in the topic area of table joining, is advantageously reduced, thereby enhancing the usability of generator 102, as well as the productivity and experience of the application developer user.

Except for the teachings of the present invention incorporated with input generator 104 and SQL statement generator 106, application generator 102 represents a broad range of application generators known in the art, including in particular, known web application generators, e.g. the web application development facilities offered by Westside, Inc. of Seattle, Wash. assignee of the present invention.

Similarly, except for the fact that applications 108 are the beneficiaries of the present invention, i.e. having selected ones of their SQL statements with their appropriate JOIN clauses automatically generated, applications 108, relational database management system 112 and relational databases 114 all represent a wide range of these elements known in the art. In particular, relational database management system 112 may e.g. be the SQL Server offered by Microsoft, Inc. of Redmond, Wash., Oracle Database Management System offered by Oracle Inc of Redwood City, Calif., Database2 (DB2) offered by IBM of Armonk, N.Y. or other relational database management systems (RDBMS) of the like.

Multi-Part Looked-Up Field

Figure 2:
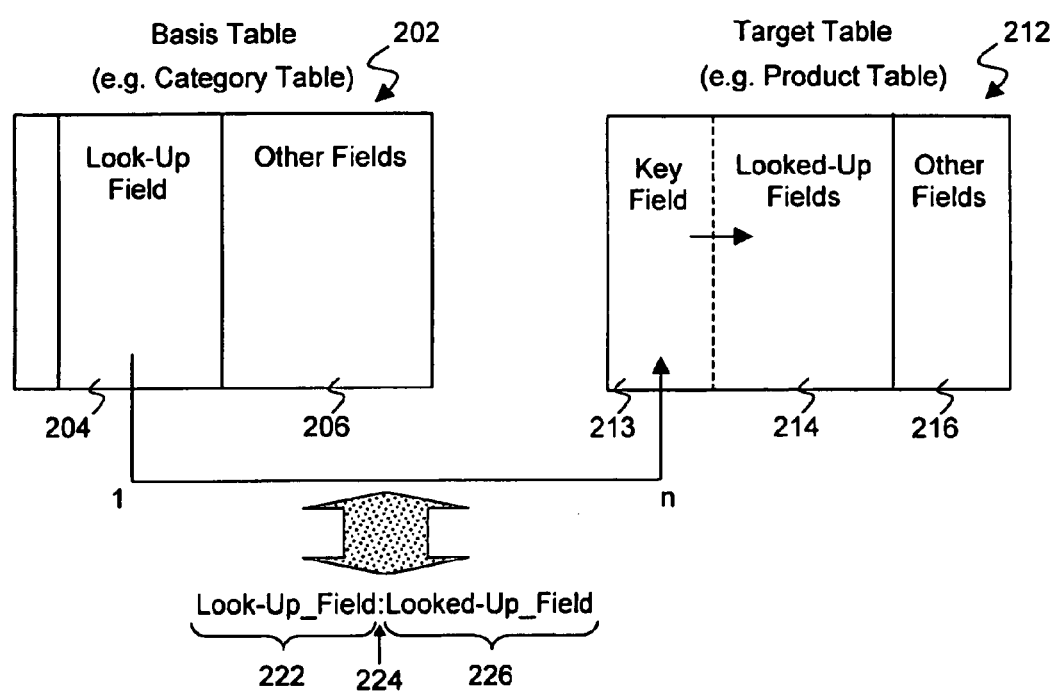
FIG. 2 illustrates the concepts of look-up field and looked-up field, with the looked-up field referenced using the multi-part form of the present invention.

Turning now to FIG. 2, wherein the multi-part looked-up table field of the present invention, and the relationship between the various parts to the basis and target tables, in accordance with one embodiment, is illustrated. As shown, for the embodiment, the multi-part looked-up table field of the present invention is expressed in two parts, a first part 222 corresponding to the look-up field 204 in a basis table 202 (also referred to as a foreign key of the table), and a second part 226 corresponding to the looked-up field 214 in a target table 212 (also referred to as a primary 213 of the table), concatenated to first part 222 using a special character 224 (e.g. ":"). For examples, 1) a "customer description" field (to be looked up) may be expressed under the present invention in the form of customer_id:customer_description,
2) a "product description" field (to be looked up) may be expressed under the present invention in the form of product_id:product_description, or an "employee names" field (to be looked up) may be expressed under the present invention in the form of employee_id:employee_name. As alluded to earlier and illustrated, the corresponding look-up field 204 (or foreign key) is a member of a "basis" table 202, whereas the corresponding looked-up field 214 (or primary key) is a member of a "target" table 212. Of course, each table 202 or 212 may comprise other fields 206 and 216.

In alternate embodiments, other conventions, such as a convention involving more than two parts, may be practiced. Further, the "conjunction" may be other special characters, such as "~", "!", "@", "#", "$", "%", "^", "&", "*", "|", "<", ">", or ".", using selected combinations of multiple ones of these special characters, e.g. "<>", or even non-special characters.

In one embodiment, multiple conjunctions are employed, with one conjunction, such as ":" denoting an Outer JOIN, and another conjunction such as "::" denoting an Inner JOIN. In other embodiments, additional conjunction denoting other types of JOINs, such as a Union JOIN may also be practiced.

Further, in other embodiments, the multi-part looked-up table field of the present invention may be expressed in more than two parts, e.g. three parts, with a first part corresponding to the look-up field in a basis table, a second part corresponding to a first looked-up field in a first target table (which in turn is used as look-up field), and a third part corresponding to a second looked-up field in a second target table. As before, the different parts are concatenated to each other using a special character (e.g. ":"). For example, product_id:category_id:category_name, specifying the looked-up field "category_name", to be looked up using a look-up field "category_id", which itself is looked up using a look-up field "product_id".

SQL Statement Generation

Figure 3:
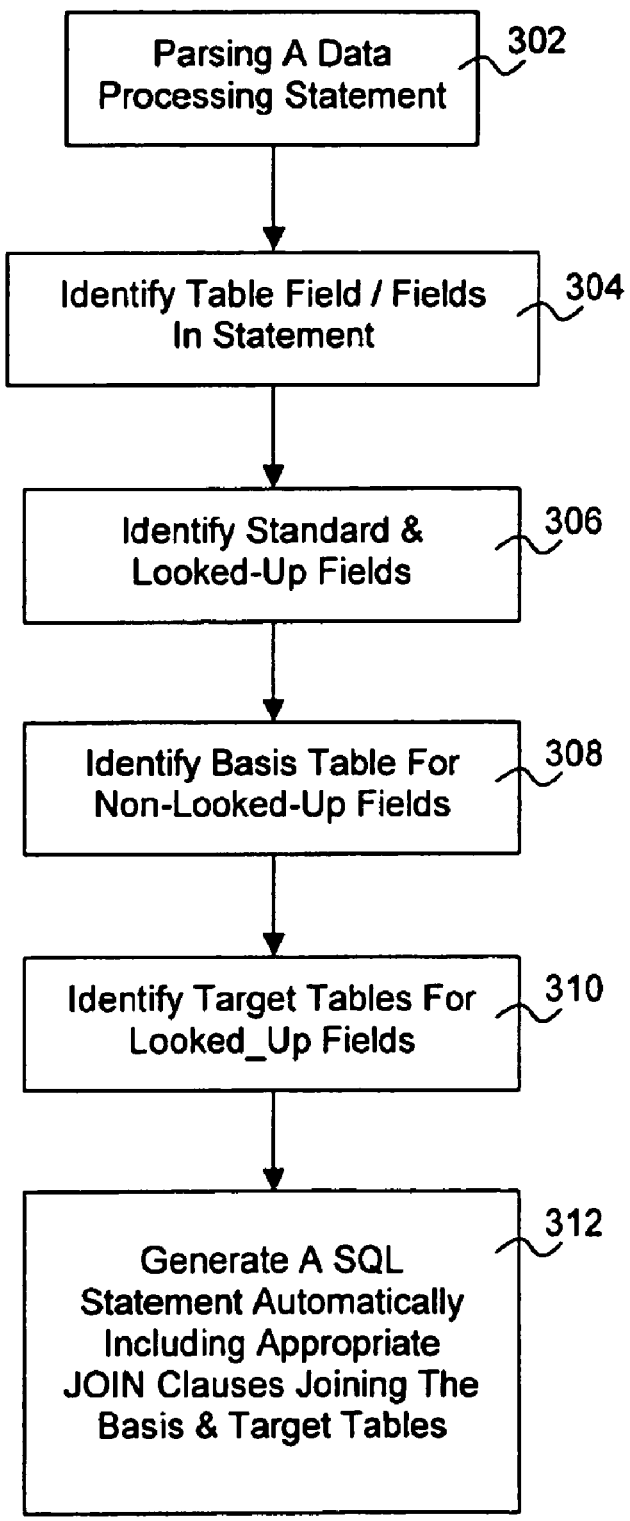
FIG. 3 illustrates the operational flow of the relevant aspects of the SQL generator of FIG. 1, incorporated with the support for the multi-part looked-up field of the present invention, in accordance with one embodiment.

FIG. 3 illustrates the operation flow of the relevant aspects of SQL statement generator 106 of FIG. 1, in the context of a data access request, in accordance with one embodiment. The embodiment assumes SQL statement generator 106 receives a data access request statement in a non-SQL form as input. In one embodiment, the data access request statement has the syntax of Table Select {field name [, field name [ . . . ]]}
where field name may be a conventional field name (e.g. user_id) or a multi-part looked_up field name of the present invention (e.g. user_id:username).

However, as alluded to earlier, the present invention is not so limited, in other embodiments, the present invention may also be practiced with other SQL statements, such as an INSERT, an UPDATE and a DELETE statement, as well as other "request" statement syntaxes may also be practiced. In yet other embodiments, the substance of the request may also be communicated to SQL statement generator 106 in a non-statement form, e.g. through a function call or other techniques of parameter passing.

As illustrated in FIG. 3, for the embodiment, the relevant operation flow starts at operation 302, where generator 106 parses the input statement, e.g. to tokenize the elements in the input statement. Thereafter, for the embodiment, generator 106 identifies table field or fields in the input statement, operation 304. Further, generator 106 identifies whether the fields are "standard" (i.e. non-looked-up) table field or fields or the fields are looked-up fields, operation 306. In one embodiment, the determination is made based on a predetermined syntax of the multi-part looked-up field. At blocks 308 and 310, generator 106 identifies the table (also referred to earlier as the basis table) of which the "standard" or non-looked-up field or fields are members, and the tables (also referred to earlier as the target tables) from which the specified looked-up fields are to be looked up. In various embodiments, generator 106 identifies the table membership by accessing a data dictionary (not shown). In some of these embodiments, generator 106 maintains at least a work copy of the data dictionary.

Thereafter, upon identifying the respective tables of which the standard (non-looked-up) and looked-up fields are members, as described earlier, generator 106 automatically generates a functional equivalent SQL SELECT statement, enumerating the fields to be selected, a FROM clause, the basis table, and where applicable, the JOIN clauses and the target tables, as well as the associated ON clauses including the condition governing the joining of the rows of the joined tables, block 312.

For examples,
(a) for the input statement Table Select {student_id, class_id:class_name, teacher_id:teacher_name,}, generator 106 generates SELECT enrollment.student_id, class.class_name, teacher.teacher_name FROM enrollment LEFT OUTER JOIN class ON enrollment.class_id= class.class_id LEFT OUTER JOIN teacher ON enrollment.teacher_id= teacher.teacher_id;
(b) for the input statement Table Select {order_no, product_id:product_name, product_id:category_id: category_name}, generator 106 generates SELECT order_items.order_no, products.product_name, categories.category_name FROM (order_items LEFT OUTER JOIN products ON order_items.product_id=products.product_id) LEFT OUTER JOIN categories ON products.category_id=categories.category_id ("order_items", "products" and "categories" are the table names); and
(c) for the input statement Table Select {task_name, assignedto:user_name, openedby:user_name} generator 106 generates SELECT tasks.task_name, users$_1$.user_name, users$_2$.user_name FROM tasks LEFT OUTER JOIN users users$_1$ ON tasks.assignedto=users$_1$.user_id LEFT OUTER JOIN users users$_2$ ON tasks.openedby=users$_2$.user_id.

Field Selection

Figure 4A:
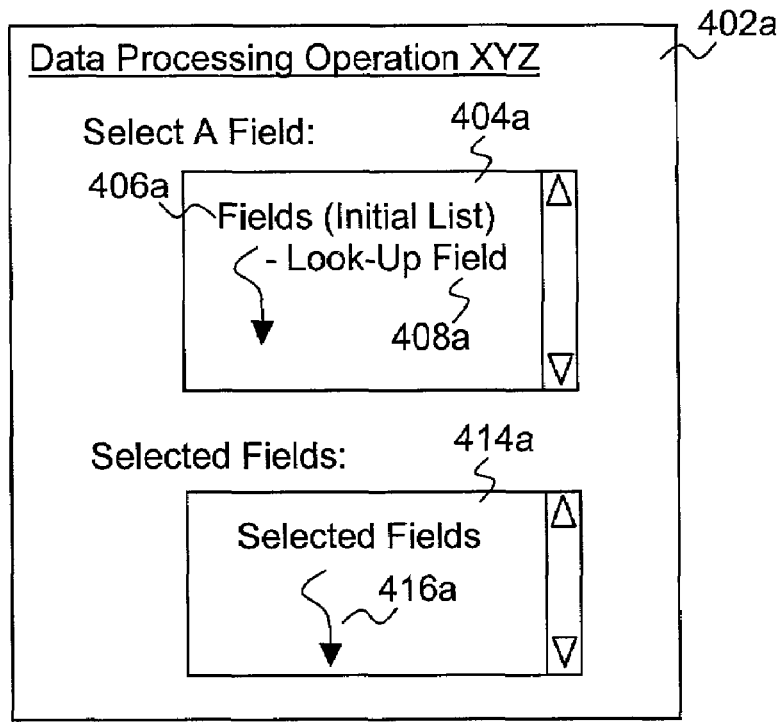
FIGS. 4a–4b illustrate an example user interface of an example data processing operation, utilizing the multi-part looked-up field of the present invention, in accordance with one example application.
Figure 4B:
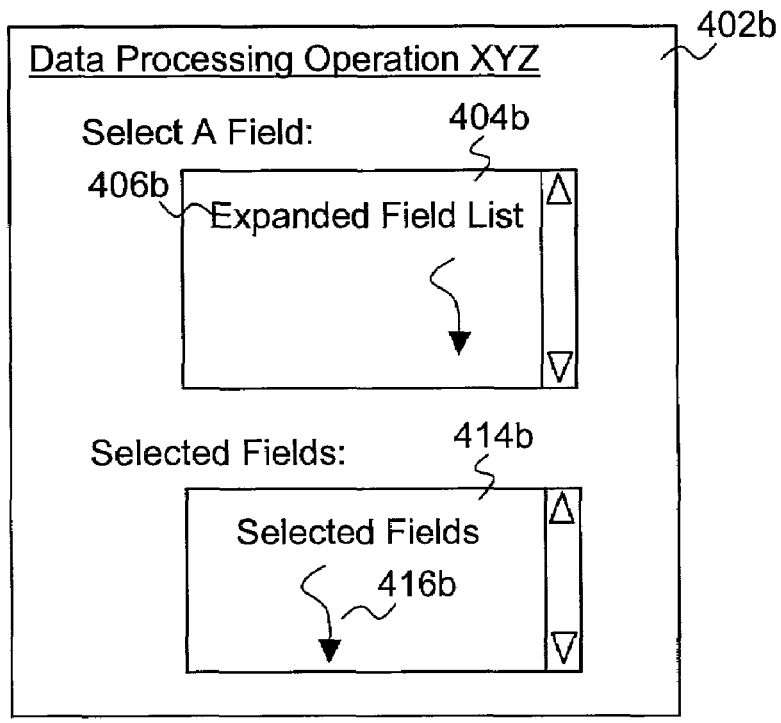

FIGS. 4a–4b illustrate an example user interface for selecting fields for a data processing operation, including usage of the multi-part looked-up field of the present invention, in accordance with one embodiment. The embodiment assumes in the course of table definition, a field may be designated as a look-up field, and each look-up field has a target table designated. Any one of a number of user interfaces and supporting logic may be practiced to facilitate such definition. The subject matter is beyond the scope of the present invention, and since it is well within the ability of those skilled in the art, such definitional facilities will not be described.

FIG. 4a illustrates a first state 402a of this user interface, wherein for a list 404a of eligible table fields 406a is first initially presented for an application developer user to select for inclusion in a data processing operation, which as earlier described, may e.g. be a report generation operation. Fields 406a may include in particular fields that are pre-defined look-up field 408a. For the embodiments, selected fields 416a are "echoed" and displayed in area 414a.

FIG. 4b illustrates a second state 402b of this user interface, wherein upon selection of one of the look-up field 408a, the list 404b of eligible table fields 406b is expanded to include table fields of the designated target table of the selected look-up field. For the embodiment, the added table fields to be looked up are advantageously displayed using the multi-part looked-up field name of the present invention, e.g. look-up _field:lookedup_field. For the embodiment, selected fields 416b remained "echoed" and displayed in area 414b.

Figure 5:
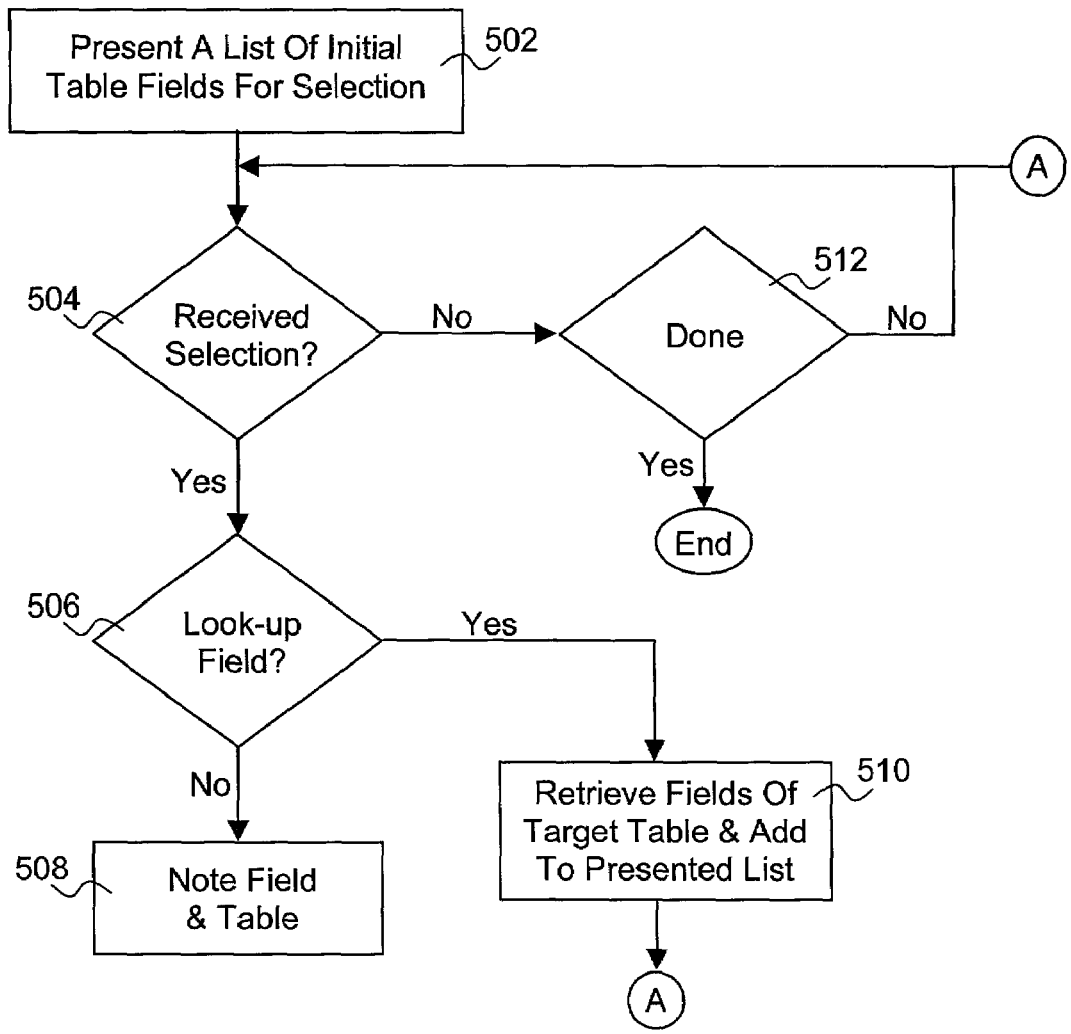
FIG. 5 illustrates the operational flow of the relevant aspects of the input component of FIG. 1 in support of the user input interface of FIGS. 4a–4b, in accordance with one embodiment.

FIG. 5 illustrates the operational flow of the relevant aspect of input component 104, in accordance with one embodiment. As illustrated and alluded to earlier, initially at block 502, input component 104 presents a first list of fields for selection by an application developer user for inclusion in a data processing operation. Then input component 104 awaits for either a user selection of one of the listed fields or an indication of termination of operation, blocks 504 and 512.

Upon receipt of a user selection, yes branch of block 504, input component 104 determines if the selected field is a defined look-up field, block 506. If the selected field is determined to be a defined look-up field, input component 104 retrieves the fields of the pre-designated target table, add the retrieved fields to the list of fields available for user selection, block 510. Otherwise, input component 104 simply notes the field selected, and the table of which the selected field is member, block 508.

In one embodiment, the collected information is subsequently provided to SQL generator 106 to automatically generate a functional equivalent SQL SELECT statement, including in particular, the appropriate JOIN and ON clauses.

In one embodiment, the collected information is provided to SQL generator 106 in the syntax of the earlier described Table Select statement. In another embodiment, the collected information is provided to SQL generator 106 through a function call.

Example Computer System

Figure 6:
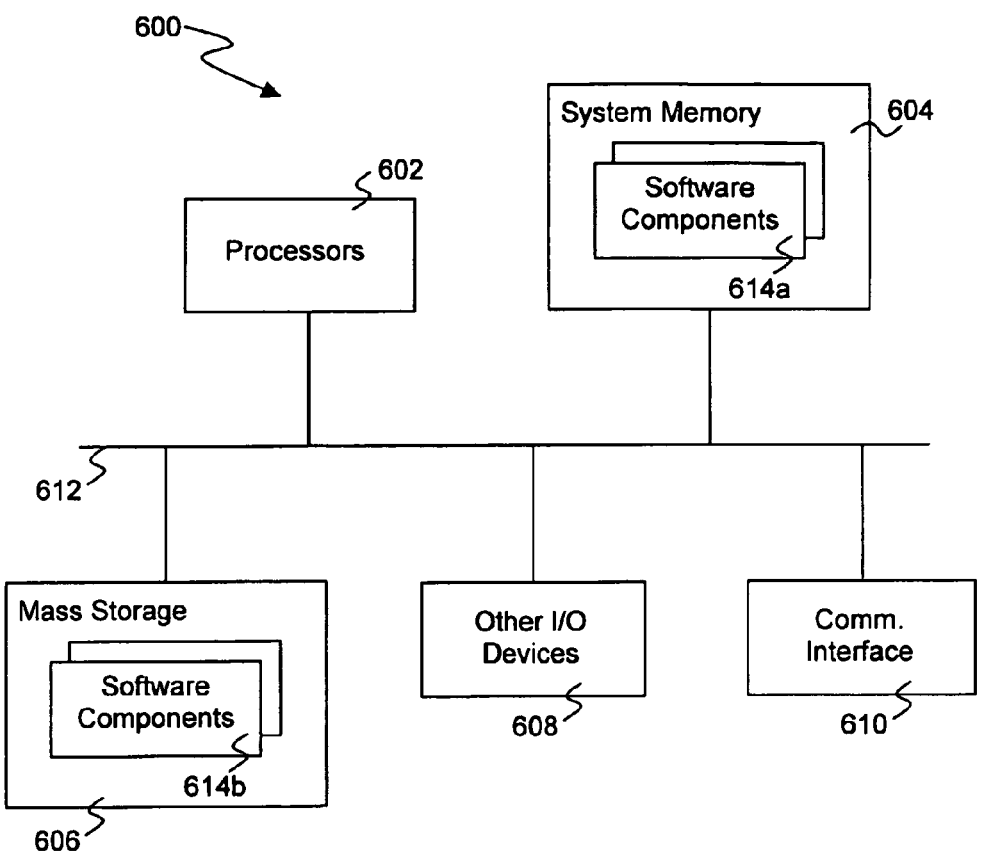
FIG. 6 illustrates an internal component view of a computer system suitable for use to practice the present invention, in accordance with one embodiment.

FIG. 6 illustrates an example computer system suitable for use to practice the present invention in accordance with one embodiment. As shown, computer system 600 includes one or more processors 602 and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy and a permanent copy of the programming instructions implementing the software components 614a, 614b (e.g. input component 104 and/or SQL statement generator 106) incorporated with the teachings of the present invention. The permanent copy of the programming instructions may be loaded into mass storage 606 in the factory, or in the field, as described earlier, through a distribution medium (not shown) or through communication interface 610 (from a distribution server (not shown). The constitution of these elements 602–612 are known, and accordingly will not be further described.

Conclusion and Epilog

Thus, an improved method and apparatus for accessing and processing data disposed in multiple tables of a relational database has been described. While the present invention has been described in terms of the above illustrated embodiments, those skilled in the art will recognize that the invention is not limited to the embodiments described. The present invention can be practiced with modification and alteration within the spirit and scope of the appended claims. For example, the multi-part looked-up field name of the present invention may be used to improve the ease of use of other SQL statements and/or clauses, such as in addition to the aforementioned INSERT, UPDATE and DELETE statements, the WHERE, GROUP BY and SORT clauses. Thus, the description is to be regarded as illustrative instead of restrictive on the present invention.

What is claimed is:

1. A method comprising:
parsing a data processing statement;
identifying table field or fields referenced in said data processing statement;
for each identified table field, determining whether the table field is a looked-up field;
identifying a basis table of which non-looked up ones of said identified table field or fields are members;
identifying one or more target tables from which said looked-up one or ones of said identified table field or fields are to be looked up;
generating a SQL statement, including with said generated SQL statement field or fields to be selected from said basis table and a FROM clause enumerating said basis table, and if the data processing statement was determined to contain one or more fields to be looked up from one or more target tables, further including among said field or fields to be selected said one or more fields to be looked up from said one or more target tables, and one or more JOIN clauses respectively joining said basis table and said one or more target tables, and one or more corresponding ON clauses respectively specifying one or more corresponding conditions on which rows of said basis and said one or more target tables are to be joined, each of said one or more conditions comprising a corresponding look-up field.

2. The method of claim 1, wherein said determining of whether a table field is a looked-up field comprises determining whether the table field is a multi-part table field including at least a first part corresponding to a look-up field, and a second part corresponding to a field to be looked up, concatenated with said first part in a predetermined manner.

3. The method of claim 2, wherein said determining of whether a table field is a look-up field further comprises upon determining that the table field is a multi-part table field, determining whether the second part is a look-up field, with a third part corresponding to a looked up field concatenated with said second part in a predetermined manner.

4. The method of claim 2, wherein said second part corresponding to a field to be looked up, is concatenated with said first part corresponding to a look-up field, employing one or more predetermined special characters.

5. The method of claim 4, wherein said one or more predetermined special characters comprises at least a selected one of ".", ":", "~", "!", "@", "#", "$", "%", "^", "&", "*", "-", "+", "=", "?", "<" and ">".

6. The method of claim 1, wherein said JOIN clause is an OUTER JOIN clause.

7. The method of claim 1, wherein said JOIN clause is an INNER JOIN clause.

8. The method of claim 1, wherein said SQL statement is a selected one of a SELECT, an INSET, an UPDATE and a DELETE statment.

9. An apparatus comprising:
storage medium having stored therein programming instructions, when executed, operate the apparatus to
parse a data processing statement,
identify table field or fields referenced in said data processing statement, determine, for each identified table field, whether the table field is a looked-up field, identify a basis table of which non-looked up ones of said identified table field or fields are members, identify one or more target tables from which said looked-up one or ones of said identified table field or fields are to be looked up, and generate a SQL statement, including with said generated SQL statement field or fields to be selected from said basis table and a FROM clause enumerating said basis table, and if the data processing statement was determined to contain one or more fields to be looked up from one or more target tables, further including among said field or fields to be selected said one or more fields to be looked up from said one or more target tables, and one or more JOIN clauses respectively joining said basis table and said one or more target tables, and one or more corresponding ON clauses respectively specifying one or more corresponding conditions on which rows of said basis and said one or more target tables are to be joined, each of said one or more conditions comprising a corresponding look-up field; and one or more processors coupled to the storage medium to execute the programming instructions.

10. The apparatus of claim 9, wherein said programming instructions, when executed, enable the apparatus to determine whether a table field is a looked-up field by determining whether the table field is a multi-part table field including at least a first part corresponding to a look-up field, and a second part corresponding to a field to be looked up, concatenated with said first part in a predetermined manner.

11. The apparatus of claim 10, wherein said programming instructions, when executed, enable the apparatus to, upon determining that the table field is a multi-part table field, determine whether the second part is also a look-up field, with a third part corresponding to a looked up field concatenated with said second part in a predetermined manner.

12. The apparatus of claim 11, wherein said second part corresponding to a field to be looked up, is concatenated with said first part corresponding to a look-up field, employing one or more predetermined special characters.

13. The apparatus of claim 12, wherein said one or more predetermined special characters comprises at least a selected one of ".", ":", "~", "!", "@", "#", "$ ", "%", "^", "&", "-", "+", "=", "?", "<" and ">".

14. The apparatus of claim 9, wherein said JOIN clause is an OUTER JOIN clause.

15. The apparatus of claim 9, wherein said JOIN clause is an INNER JOIN clause.

16. The apparatus of claim 9, wherein said SQL statement is a selected one of a SELECT, an INSERT, an UPDATE and a DELETE statement.

* * * * *

UNITED STATES PATENT AND TRADEMARK OFFICE
CERTIFICATE OF CORRECTION

PATENT NO. : 6,988,094 B2 Page 1 of 1
APPLICATION NO. : 10/038412
DATED : October 25, 2001
INVENTOR(S) : Matthew A. Bellew It is certified that error appears in the above-identified patent and that said Letters Patent is hereby corrected as shown below:

Column 4,
Line 47, "... "employee names" field..." should read --..."employee name" field...--.

Column 8
Line 56, "...an INSET, an...." should read --...an INSERT, an...--.

Column 10
Line 17, "..."&","-",..." should read --..."&","*","-",...--.

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 6,988,094 B2
APPLICATION NO. : 10/038412
DATED : January 17, 2006
INVENTOR(S) : Matthew A. Bellew It is certified that error appears in the above-identified patent and that said Letters Patent is hereby corrected as shown below:

Column 4,
Line 47, "... "employee names" field..." should read --..."employee name" field...--.

Column 8
Line 56, "...an INSET, an...." should read --...an INSERT, an...--.

Column 10
Line 17, "..."&","-",..." should read --..."&","*","-",...--.

This certificate supersedes Certificate of Correction issued April 3, 2007.

Signed and Sealed this

Eighth Day of May, 2007

JON W. DUDAS
*Director of the United States Patent and Trademark Office*